(12) United States Patent
Stopczynski

(10) Patent No.: US 11,524,532 B2
(45) Date of Patent: Dec. 13, 2022

(54) INTEGRATED TIRE INFLATION/DEFLATION ADJUSTMENT SYSTEM

(71) Applicant: Continental Automotive Systems Inc., Auburn Hills, MI (US)

(72) Inventor: Lawrence G. Stopczynski, Milford, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 419 days.

(21) Appl. No.: 16/688,005

(22) Filed: Nov. 19, 2019

(65) Prior Publication Data

US 2020/0207162 A1 Jul. 2, 2020

Related U.S. Application Data

(60) Provisional application No. 62/786,055, filed on Dec. 28, 2018.

(51) Int. Cl.
*B60C 23/02* (2006.01)
*B60C 23/00* (2006.01)
*B60C 23/04* (2006.01)
*B60C 23/12* (2006.01)

(52) U.S. Cl.
CPC .......... *B60C 23/002* (2013.01); *B60C 23/003* (2013.01); *B60C 23/0408* (2013.01); *B60C 23/12* (2013.01)

(58) Field of Classification Search
CPC . B60C 23/002; B60C 23/003; B60C 23/0408; B60C 23/12

USPC ......................................................... 701/36
See application file for complete search history.

(56) References Cited

U.S. PATENT DOCUMENTS

| 5,611,875 A * | 3/1997 | Bachhuber ........ B60C 23/00372 141/95 |
| 5,629,873 A | 5/1997 | Mittal et al. |
| 6,212,464 B1 | 4/2001 | Skotnikov |
| 2005/0102073 A1* | 5/2005 | Ingram, II ............ B60C 23/008 701/31.4 |
| 2011/0203710 A1* | 8/2011 | Hinojosa, Jr. ........... B60C 23/10 152/419 |
| 2016/0052351 A1* | 2/2016 | Dilisio .............. B60C 23/00372 137/224 |
| 2016/0059643 A1* | 3/2016 | Infantini ................ B60C 23/002 152/415 |

(Continued)

FOREIGN PATENT DOCUMENTS

CN 201858394 U 6/2011

*Primary Examiner* — Jonathan M Dager
*Assistant Examiner* — Jean W Charleston

(57) ABSTRACT

A tire pressure system for a vehicle includes an inflation/deflation system that includes a compressor and a valve in fluid communication with four tires. Each of the four tires have a tire pressure. At least one sensor is configured to receive at least one of vehicle location data, vehicle environmental data and other sensor information. A controller is in communication with the inflation/deflation system and the at least one sensor. The controller is configured to select at least one of the four tires to adjust the tire pressure of the selected at least one of the four tires. The controller is configured to control at least one of the valve and compressor to achieve at least one of desired fuel economy and desired road control of the selected at least one of the four tires.

17 Claims, 2 Drawing Sheets

(56) References Cited

U.S. PATENT DOCUMENTS

2017/0217261 A1\* 8/2017 Mays .................. B60C 23/0486
2018/0186198 A1 7/2018 Zhou et al.
2018/0312018 A1\* 11/2018 Wilson .............. B60C 23/00354

\* cited by examiner

INTEGRATED TIRE INFLATION/DEFLATION ADJUSTMENT SYSTEM

CROSS-REFERENCE TO RELATED APPLICATIONS

This application claims priority to U.S. Provisional Application No. 62/786,055, which was filed on Dec. 28, 2018.

BACKGROUND

This disclosure relates to an integrated tire inflation/deflation adjustment system, which provides improved fuel economy as well as enhanced vehicle control.

Driving a vehicle with low tire pressure negates many of the fuel economy efforts made by carmakers to reduce vehicle rolling resistance. Various approaches are being developed to provide consistent, desired rolling resistance from the tires. One example approach incorporates an air maintenance system, which periodically "tops off" the tire pressure to a desired pressure, providing consistently firm tires that reduce rolling resistance that helps improve fuel economy. Such systems may not be desirable in all driving conditions.

SUMMARY

In one exemplary embodiment, a tire pressure system for a vehicle includes an inflation/deflation system that includes a compressor and a valve in fluid communication with four tires. Each of the four tires have a tire pressure. At least one sensor is configured to receive at least one of vehicle location data, vehicle environmental data and other sensor information. A controller is in communication with the inflation/deflation system and the at least one sensor. The controller is configured to select at least one of the four tires to adjust the tire pressure of the selected at least one of the four tires. The controller is configured to control at least one of the valve and compressor to achieve at least one of desired fuel economy and desired road control of the selected at least one of the four tires.

In a further embodiment of any of the above, the controller is configured to command the inflation/deflation system to control the tire pressure of all four tires simultaneously.

In a further embodiment of any of the above, the at least one sensor detects wet and/or icy conditions. The controller is configured to deflate the all four tires in response to the wet and/or icy conditions.

In a further embodiment of any of the above, the controller is configured to command the inflation/deflation system to control the tire pressure of only two of the four tires simultaneously.

In a further embodiment of any of the above, the only two of the four tires consists of front tires.

In a further embodiment of any of the above, the at least one sensor includes a crash detection sensor. The controller is configured to command the inflation/deflation system to deflate the front tires when the crash detection sensor detects an imminent crash.

In a further embodiment of any of the above, the only two of the four tires consist of side tires on a same lateral side of the vehicle.

In a further embodiment of any of the above, the at least one sensor determines a position of the vehicle in relation to a roadway shoulder. The controller is configured to command the inflation/deflation system to deflate the side tires when the side tires are predicted to travel on the roadway shoulder.

In a further embodiment of any of the above, the at least one sensor determines a presence of a pothole. The controller is configured to command the inflation/deflation system to deflate the side tires when the side tires are predicted to travel over the pothole.

In a further embodiment of any of the above, side tires include a front tire and a rear tire. The controller delays the deflation of the rear tire as compared to the front tire.

In a further embodiment of any of the above, the controller is configured to command the inflation/deflation system to control the tire pressure of only one of the four tires.

In a further embodiment of any of the above, the at least one sensor is a tire pressure sensor for the only one of the four tires. The controller is configured to command the inflation/deflation system to inflate the only one of the four tires when the controller detects a tire leak in the only one of the four tires.

In another exemplary embodiment, a method of controlling tire pressure in a vehicle, the vehicle including an inflation/deflation system that has a compressor and a valve, the method includes a vehicle operating condition being detected. The method further includes at least one of but fewer than four tires being selected based upon the vehicle operating condition. The method further includes the tire pressure of the at least one of but fewer than four tires with the inflation/deflation system being adjusted to provide at least one of desired fuel economy and desired road control for the vehicle operating condition.

In a further embodiment of any of the above, the detecting includes the vehicle condition being detected in real time.

In a further embodiment of any of the above, the selected at least one of but fewer than four tires consists of front tires of the vehicle.

In a further embodiment of any of the above, the detected vehicle operating condition corresponds to an imminent crash. The adjusting step deflates the front tires.

In a further embodiment of any of the above, the selected at least one of but fewer than four tires consist of side tires on a same lateral side of the vehicle.

In a further embodiment of any of the above, the detected vehicle operating condition corresponds to a position of the vehicle in relation to a roadway shoulder. The adjusting step deflates the side tires when the side tires are predicted to travel on the roadway shoulder.

In a further embodiment of any of the above, the detected vehicle operating condition corresponds to a presence of a pothole. The con adjusting step deflates the side tires when the side tires are predicted to travel over the pothole.

In a further embodiment of any of the above, the side tires include a front tire and a rear tire. The adjusting step delays the deflation of the rear tire as compared to the front tire.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
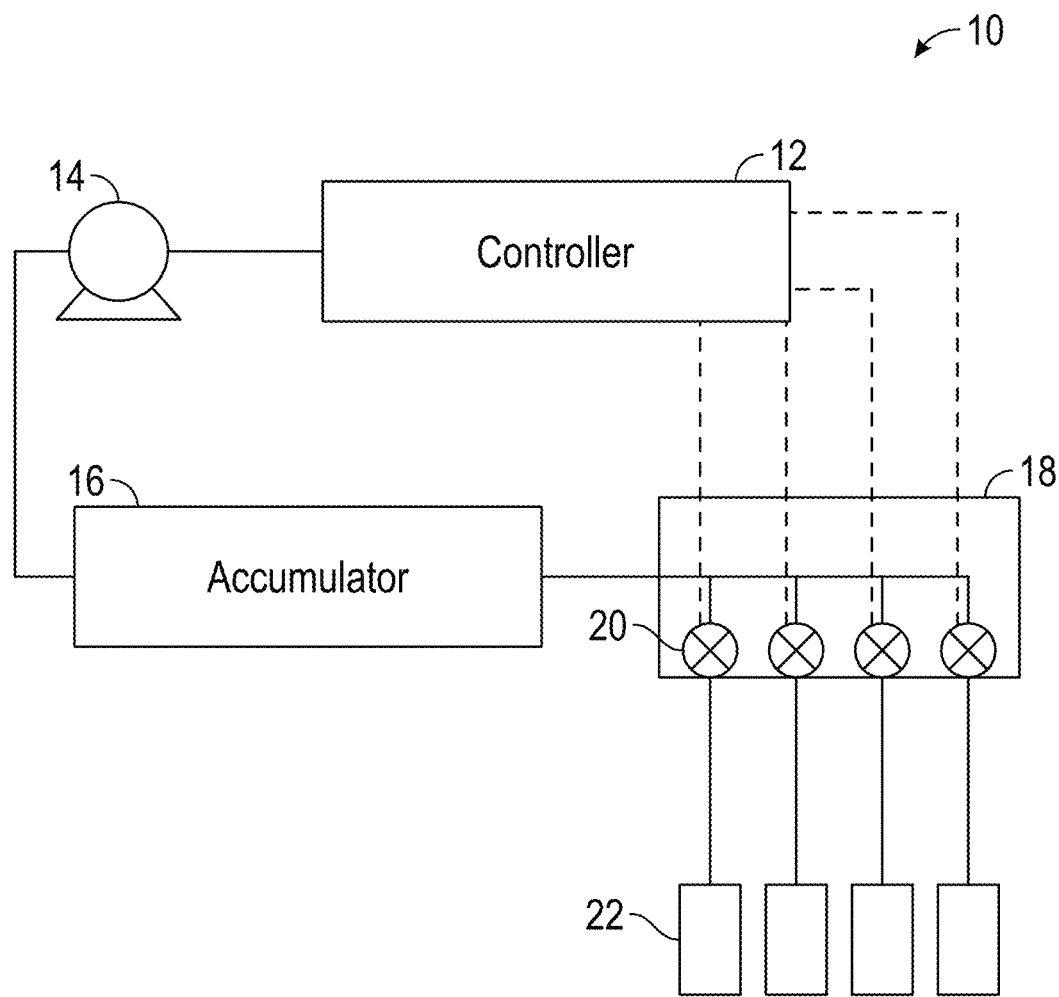
FIG. 1 is a highly schematic view of an example tire inflation/deflation adjustment system.
Figure 2:
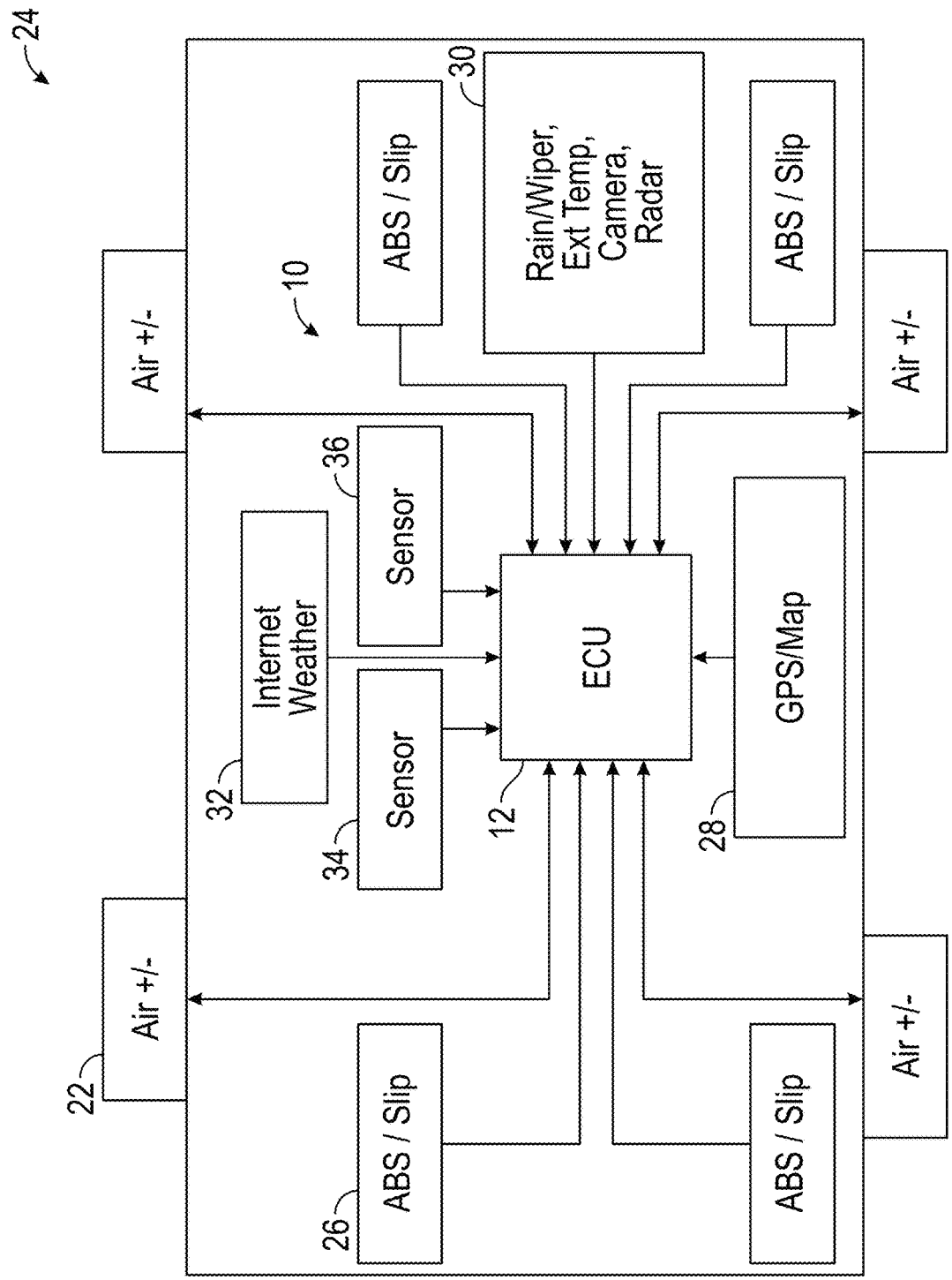
FIG. 2 is a schematic view of a vehicle incorporating the integrated tire inflation/deflation adjustment system shown in FIG. 1 with various vehicle sensors and controls.

FIG. 1 illustrates a highly schematic depiction of an integrated tire inflation/deflation system 10. The system 10 includes a controller 12 in communication with a compressor pump 14 and multiple valves 20 in a valve block 18. The pump 14 supplies pressurized air to an accumulator 16, which selectively provides compressed air to tires 22. Typically, the inflation/deflation system 10 is in fluid communication with four tires 22, each of which has a tire pressure The system 10 may also release air pressure from the tires 22 in a controlled manner via the valves 20. It should be understood that the system 10 illustrated is highly schematic, and may include fewer, greater or different components than those shown. Moreover, the components may be arranged in a different manner than shown.

At least one sensor is in communication with the controller 12 and is configured to receive at least one of vehicle location data, vehicle environmental data and other sensor information. Various implementations of sensor combinations may be realized, from just one sensor making it a simpler lower-cost system, to a multi-sensor fused system. Of course the sensors could also be shared with other vehicle features. Thus, the controller 12 receives a variety of vehicle related information useful for estimating or predicting vehicle handling and control characteristics.

In operation, the tire pressure in the vehicle is controlled by detecting a vehicle operating condition. For example, during certain adverse weather or road conditions, such as wet/icy conditions or on roadways with potholes, increasing tire pressure can have a negative effect of lowering tire road grip or increasing tire blowout potential, which may lead to a potentially less safe driving condition. Thus, the disclosed system 10 may increase and decrease tire pressure as needed in real time based upon the overall conditions experienced by or anticipated for the vehicle 10. Thus, the disclosed system 10 provides an integrated architecture for an automated, adaptively adjustable tire air pressure system balancing both fuel economy and road control.

The controller selects at least one of the four tires for adjustment of the tire pressure based upon the vehicle operating condition. The inflation/deflation system 10 is then used to adjust the tire pressure of one or more tires to provide at least one of desired fuel economy and desired road control for the vehicle operating condition.

Generally speaking, greater fuel economy is achievable with higher tire pressures. The controller 12 includes one or more algorithms that takes this information and determines the desired tire pressure to achieve both desired fuel economy and desired ride control and handling characteristics. That is, road conditions may become hazardous such that fuel economy should be sacrificed to maintain the safe operation of the vehicle. However, under most normal vehicle operating conditions, fuel economy may be maximized without compromising vehicle control and handling.

Typical modern vehicles incorporate antilock braking systems (ABS) that incorporate a wheel slip sensor 26 at each wheel. These sensors communicate wheel slip information to the controller 12. Higher tire pressures may result in increased slip under certain adverse operating conditions that is detected by the slip sensors 26. If predetermined slip thresholds are exceeded, the system 10 may decrease the tire pressure at one or more of the vehicle tires.

Vehicle location data 28, which may include GPS vehicle location and maps, may be used to determine road conditions from, for example, databases, which may include information relating to road type, conditions, potholes, etc. Vehicle environmental data sensors 30, which may include wiper operational state, rain sensor state, exterior temperature, cameras, LIDAR, radar or other environmental information, is also fed to the controller 12. A camera may identify an upcoming pothole on the roadway and proactively decrease tire pressure to prevent a blowout. This information may also be stored on the map. Similarly, the camera and other sensors may be used to detect hazardous road conditions and obstacles that would necessitate a decrease in tire pressure.

Weather information, available over the internet on many modern vehicles, is provided to the controller 12. During wet or icy conditions, the tire pressure may be decreased from the higher tire pressures desired for increased fuel economy.

The controller 12 may receive input from other sensors 34, 36, such as vehicle speed, pitch, roll, and yaw. The different data sets can be algorithmically conditioned with the controller 12 in conjunction with vehicle speed and the tire inflation/deflation system 10 to adaptively adjust tire pressure and best balance of requirements for both fuel economy and road control.

In one example, the controller 12 may be configured to command the inflation/deflation system 10 to control the tire pressure of all four tires 22 simultaneously. This may be suitable for when wet and/or icy conditions are detected.

In another example, the controller 12 may be configured to command the inflation/deflation system 10 to control the tire pressure of only two of the four tires 22 simultaneously. For example, the side tires may be adjusted as a pair, and/or the front and/or rear tires may be adjusted as a pair. When the side tires are adjusted, it may be desirable for the controller 12 to delay the deflation of the rear tire as compared to the front tire.

The controller 12 may be configured to command the inflation/deflation system 10 to deflate the front tires when a crash detection sensor detects an imminent crash as part of a pre-crash detection and reaction system. Here, the two front tires can be deflated just prior to automatic pre-crash braking to provide better road grip and stop faster. The tires can then be re-inflated after the event.

The controller 12 may be configured to command the inflation/deflation system 10 to deflate the side tires when the side tires are predicted to travel on the roadway shoulder. This may be useful when the vehicle veers off pavement onto the road shoulder and the two vehicle passenger side tires are off the road, perhaps onto dirt. It may be beneficial for the two tires on the vehicle passenger side to slightly deflate and give better road grip to that side of the vehicle. Initially perhaps only the front tire on that side of the vehicle hits the shoulder dirt first, then the rear tire hits the dirt shoulder a half-second later.

In another example, the controller 12 may be configured to command the inflation/deflation system 10 to deflate the side tires when the side tires are predicted to travel over the pothole. LIDAR can be used as a potential input sensor, or a dedicated pothole detection sensor may be used.

It is also possible to control the tire pressure of only one of the four tires. For example, the inflation/deflation system 10 can be used to inflate only the tire having a tire leak detected. A tire that is deflating quickly due to a blowout, or perhaps due to a larger hole in the tire could also have its inflation mechanism set to 'maximum' to try and keep air in the tire for as long as possible.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A tire pressure system for a vehicle, the tire pressure system comprising:
    an inflation/deflation system including a compressor and a valve in fluid communication with a plurality of tires of the vehicle;
    at least one sensor configured to detect at least one of a vehicle location, a vehicle environment, and a vehicle operating condition of the vehicle; and
    a controller in communication with the inflation/deflation system and the at least one sensor, the controller configured to determine adjusted tire pressures of a subset of the plurality of tires of the vehicle based on the vehicle location, the vehicle environment, and the vehicle operating condition of the vehicle, and control at least one of the valve and compressor to adjust the tire pressures of the subset of the plurality of tires of the vehicle to the adjusted tire pressures,
    wherein the subset of the plurality of tires comprises at least two tires, and the subset of the plurality of tires comprises less than all of the plurality of tires.

2. The tire pressure system of claim 1, wherein the controller is configured to command the inflation/deflation system to simultaneously adjust the tire pressures.

3. The tire pressure system of claim 2, wherein the vehicle environment comprises wet and/or icy condition.

4. The tire pressure system of claim 1, wherein the subset of the plurality of tires comprises front tires of the vehicle.

5. The tire pressure system of claim 4, wherein the at least one sensor comprises a crash detection sensor configured to detect an imminent crash of the vehicle, and
    wherein the controller is configured to control the inflation/deflation system to adjust to deflate the front tires of the vehicle based on the crash detection sensor detecting the imminent crash.

6. The tire pressure system of claim 1, wherein the subset of the plurality of tires comprises only tires on a same lateral side of the vehicle.

7. The tire pressure system of claim 6, wherein the vehicle location comprises a roadway shoulder, and
    wherein the controller is configured to control the inflation/deflation system to adjust to deflate the tires on the same lateral side of the vehicle corresponding to the roadway shoulder.

8. The tire pressure system of claim 6, wherein the vehicle environment comprises a presence of a pothole, and
    wherein the controller is configured to control the inflation/deflation system to adjust to deflate the tires on the same lateral side of the vehicle corresponding to the pothole.

9. The tire pressure system of claim 6, wherein the tires on the same lateral side of the vehicle comprises a front tire on the same lateral side of the vehicle and a rear tire on the same lateral side of the vehicle, and
    wherein the controller is configured to control the inflation/deflation system to delay to adjust deflation of the rear tire on the same lateral side of the vehicle as compared to the front tire on the same lateral side of the vehicle.

10. A method of controlling tire pressure in a vehicle, the method comprising:
    detecting at least one of a vehicle location, a vehicle environment, and a vehicle operating condition of the vehicle;
    determining adjusted tire pressures of a subset of a plurality of tires of the vehicle based on the vehicle location, the vehicle environment, and the vehicle operating condition of the vehicle; and
    adjusting tire pressures of the subset of the plurality of tires of the vehicle to the adjusted tire pressures,
    wherein the subset of the plurality of tires comprises at least two tires, and the subset of the plurality of tires comprises less than all of the plurality of tires.

11. The method of claim 10, wherein the adjusting comprises simultaneously adjusting the tire pressures.

12. The method of claim 10, wherein the subset of the plurality of tires comprises front tires of the vehicle.

13. The method of claim 12, wherein the detected vehicle operating condition corresponds to an imminent crash of the vehicle, and
    wherein the adjusting comprises deflating the front tires of the vehicle prior to the imminent crash.

14. The method of claim 10, wherein the subset plurality of tires comprises only tires on a same lateral side of the vehicle.

15. The method of claim 14, wherein the detected vehicle location comprises a roadway shoulder, and
    wherein the adjusting comprises deflating tires on the same lateral side of the vehicle corresponding to the roadway shoulder.

16. The method of claim 14, wherein the detected vehicle environment comprises a presence of a pothole, and
    wherein the adjusting comprises deflating the tires on the same lateral side of the vehicle corresponding to the pothole.

17. The method of claim 14, wherein the tires on the same lateral side of the vehicle comprise a front tire on the same lateral side of the vehicle and a rear tire on the same lateral side of the vehicle, and
    wherein the adjusting comprises delaying deflation of the rear tire on the same lateral side of the vehicle as compared to the front tire on the same lateral side of the vehicle.

* * * * *